Aug. 20, 1963     K. R. JOHNSON     3,101,021
DOUGHNUT CUTTERS
Filed May 26, 1960
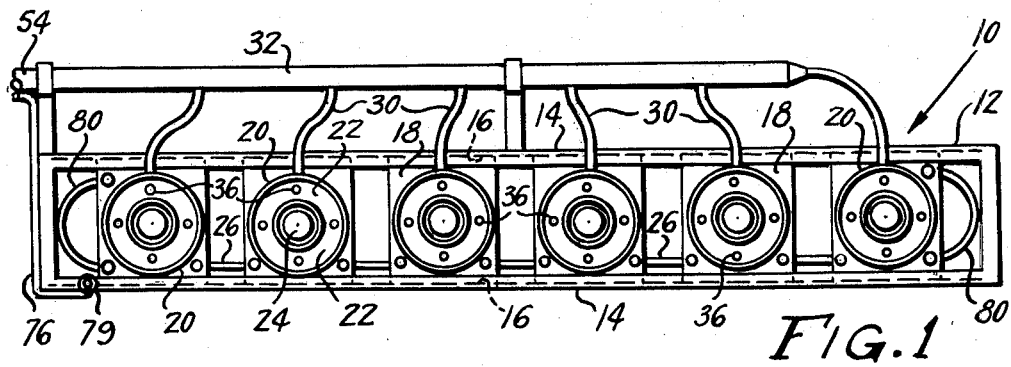
FIG. 1
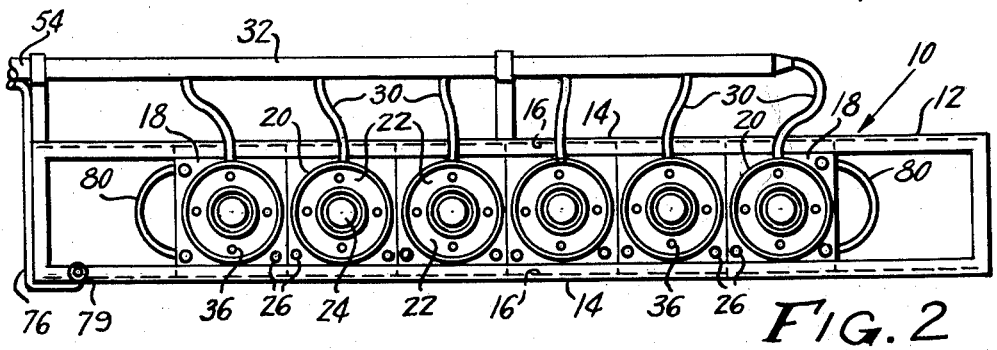
FIG. 2
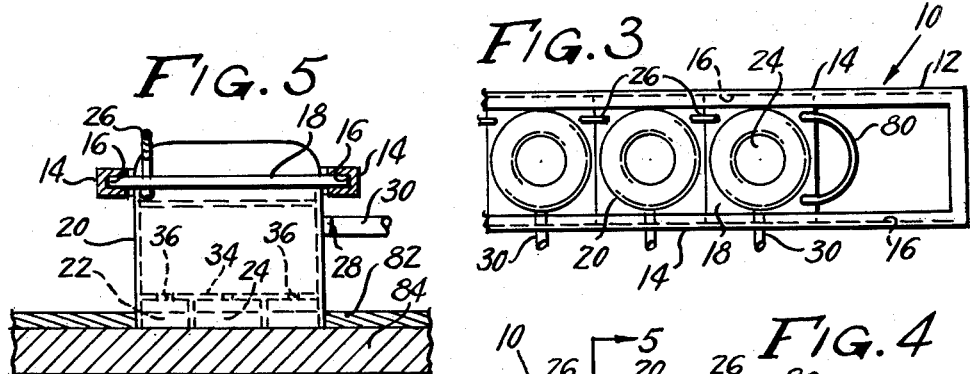
FIG. 5     FIG. 3
FIG. 4
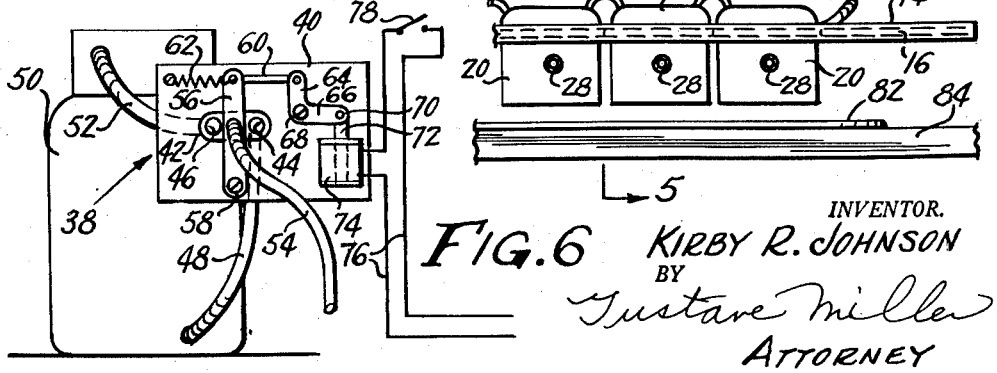
FIG. 6
INVENTOR.
KIRBY R. JOHNSON
BY
Gustave Miller
ATTORNEY

United States Patent Office 3,101,021
Patented Aug. 20, 1963

3,101,021
DOUGHNUT CUTTERS
Kirby R. Johnson, Monroe, La., assignor to
Gustave Miller, Washington, D.C.
Filed May 26, 1960, Ser. No. 31,894
1 Claim. (Cl. 83—99)

This invention relates to a doughnut cutter, and it particularly relates to a doughnut cutter for forming the doughnut blanks in batches.

Batch type doughnut cutters have heretofore been extensively used. However, these prior devices were usually quite inefficient because of the inordinately large amount of scrap dough which they produced. For practical and economic purposes, this scrap dough had to be re-rolled, either by itself or together with fresh dough to provide additional dough for cutting. However, even when combined with fresh dough, the re-rolled dough resulted in heavier, tougher and less digestible doughnuts.

Another disadvantage of these prior type cutters was the fact that they were generally unduly complicated, expensive, subject to easy breakdown and difficult to handle.

It is one object of the present invention to overcome the above and other disadvantages of the prior art by providing doughnut cutters which produce relatively little scrap dough.

Another object of the present invention is to provide doughnut cutters of the aforesaid type which are relatively simple in construction, easy to use and not readily subject to breakdown.

Other objects of the present invention are to provide an improved doughnut cutter of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing, in which:

FIG. 1 is a bottom view of a device embodying the present invention, the individual units being in spaced-apart, discharge position.

FIG. 2 is a view similar to FIG. 1 but with the individual units in close-together cutting position.

FIG. 3 is a fragmentary top plan view of the right hand portion of FIG. 2.

FIG. 4 is a fragmentary elevational view of the portion of the device shown in FIG. 3.

FIG. 5 is a sectional view taken on line 5—5 of FIG. 4.

FIG. 6 is a somewhat diagrammatic view of the valve system for operating the fluid pressure discharge system.

Referring in greater deail to the drawing, wherein similar reference characters refer to similar parts, there is shown a doughnut cutting device, generally designated 10, which comprises an elongated rectangular frame 12 having oppositely disposed longitudinal portions 14 in each of which is provided a slot 16. These slots 16 are open at the inner side of their respective frame portions 14 to form guide channels for receiving the corresponding edges of generally square plates 18.

Each plate 18 forms part of an individual cutter unit which also includes a substantially cylindrical cutter head 20 supported by its corresponding plate 18. The bottom end of each cutter head 20 comprises a ring-shaped channel or die 22 surrounding a plug 24 situated centrally thereof, whereby when said cutter head is impressed against a sheet of dough, the ring-shaped die portion 22 will cut out an annular dough portion, while the central plug 24 prevents entrance of any dough into the center of the cutter head.

The individual cutter units are slidable longitudinally of the frame 12 by means of the positioning of the edges of the plates 18 in the guide channels 16 (as best shown in FIG. 5). The units are, furthermore, slidable relative to each other but their separation is liimted by short tethers or cables 26 betwen adjacent units.

Each cutter head 20 is provided with a side inlet 28 (see FIG. 4) to which is connected a separate flexible conduit 30. The conduits 30 each lead to an elongated manifold 32 which is, in turn, selectively connected either to a source of fluid pressure such as a compressed air cylinder or the like, or to a source of suction, as shown in FIG. 6.

The side inlet 28 in each cutter head 20 leads into a chamber within the cutter head which is separated from the lower die portion by a floor plate or the like 34 (see FIG. 5). This floor plate 34 is provided with a series of holes 36, shown here as four in number, which provide communication between the ring-shaped die portion 22 and the inner chamber of the cutter head.

The means for selectively connecting the manifold 32 either to pressure or suction comprises a valve assembly, generally designated 38 (see FIG. 6) which includes a valve support block 40 having a valve seat 42 provided with a pair of oppositely disposed openings 44 and 46. A suction conduit 48 leading from the suction end of a blower 50 is connected to opening 44, while a blower or pressure conduit 52 connects opening 46 to the blowing or outlet end of the blower 50. A flexible conduit 54 leads from a valve head 56 to the manifold 32.

The valve head 56 is pivotally connected at one end, as at 58, to the block 40, while at its opposite end, it is connected to rod 60 extending laterally therefrom in one direction and to a spring 62 extending laterally therefrom in the opposite direction. The spring 62 is connected at its other end to the block 40 and serves to resiliently bias the valve head 56 into overlying relationship relative to the opening 46. The rod 60, on the other hand, is connected to a lever 64 forming one leg of a crankarm link 66, and pivoted as at 68, the link 66 being, in turn, pivotally connected at 70 to a solenoid plunger 72 extending from a solenoid coil 74 mounted on the block 40.

The solenoid coil 74 is electrically connected to a source of eelctrical energy (not shown) through wires 76, a switch 78 being interposed in the electrical circuit. The switch 78 is operated, as desired, either by a manual push button 79 or foot pedal (not shown).

When the switch 78 is closed, the solenoid is energized and the plunger 72 moves down to move the link 66 and lever 64 to pull rod 60 to the right (as viewed in FIG. 6). This moves valve head 56 to overlie opening 44 and connect the manifold 32 to suction, whereas it is normally connected to pressure under the action of spring 62.

In operation, the individual cutter units are pushed into abutting relationship (as in FIGS. 2 and 3) by means of handles 80 provided on each end unit. While they are in this position, they, as well as the whole supporting frame 12, are brought down so that the bottoms of the die portions press against a sheet of rolled dough 82 on a table 84 (see FIG. 5). Then, the valve head 56 is moved to suction position by closing the switch 78. The frame and its cutter units are then lifted from the dough and the suction in die portions 22 lift up the cut-out dough while the plugs 24 prevent the centers thereof from also being pulled up, and the frame and cutter are then held over a doughnut frying pan. Thereafter, the cutter units on the frame are released by manually pulling handles 80 away from each other so that they move back into separated position and the switch 78 is then opened by pressing button 79. This moves the valve head 56 back to blow-off position whereby the doughnut blanks are blown off the cutter heads down into the frying oil or the like in the pan.

The abutting relationship between the cutter units when in cutting position prevents the production of any scrap or waste dough therebetween, whereas when the device is in blow-off position (as in FIG. 1) there is sufficient separation to prevent the blown-off doughnut blanks falling too close to each other into the frying pan.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

A dough cutter device comprising an elongate generally rectangular frame, said frame comprising two elongate parallel sides provided with longitudinal channels facing toward each other and end members securing the ends of said elongate sides together, a single row of dough cutter units, each cutter unit having two opposite edge portions slidably retained within said channels, flexible tether means securing said units together for slidable movement within said channels of said frame between abutting relationship and maximum spaced apart relationship, handle means on the opposite endmost units for moving all said units between abutting relationship and maximum spaced apart relationship within said frame, a valve means, flexible conduit means connecting said valve means to each said cutter unit, and conduit means connecting said valve means to a source of suction, whereby said frame may be manipulated, with said units moved to abutting relationship, to press said cutter units into a sheet of dough to cut dough portions with a minimum of waste dough therebetween, and then said valve means, actuated to connect said units to the source of suction, effects a holding suction on the cut dough portions in the cutter units while the frame is being moved to a desired location, the endmost cutter unit handles being manipulated to spread the units to their maximum spaced apart relationship, and at the desired location, the valve means, actuated to cut off the source of suction, exposes the cut dough portions to non-holding pressure and releases the cut dough portions from the cutter units to the desired location in maximum spaced apart relationship.

References Cited in the file of this patent

UNITED STATES PATENTS

| | | |
|---|---|---|
| 665,358 | Adams | Jan. 1, 1901 |
| 2,125,480 | Avery | Aug. 2, 1938 |
| 2,487,271 | Petri | Nov. 8, 1949 |
| 2,903,290 | Morris | Sept. 8, 1959 |
| 2,941,341 | Clinton | June 21, 1960 |